United States Patent [19]

Chang et al.

[11] Patent Number: 5,424,376

[45] Date of Patent: Jun. 13, 1995

[54] ESTER CURED NO-BAKE FOUNDRY BINDER SYSTEM

[75] Inventors: Ken K. Chang, Dublin; William R. Dunnavant, Columbus; Robert B. Fechter, Worthington; Gary R. Hysell, Columbus, all of Ohio

[73] Assignee: Ashland Inc., Columbus, Ohio

[21] Appl. No.: 132,084

[22] Filed: Oct. 4, 1993

[51] Int. Cl.6 .................... C08L 61/10; C08L 61/06; B22C 9/02

[52] U.S. Cl. ................... 525/480; 525/390; 525/508; 524/594; 524/736; 524/492; 523/145; 528/129

[58] Field of Search ............ 525/480, 390, 508; 524/594, 736, 492; 523/145; 528/129

[56] References Cited

U.S. PATENT DOCUMENTS

| | | | |
|---|---|---|---|
| 4,157,993 | 6/1979 | Funabiki et al. | 260/28 P |
| 4,647,952 | 3/1987 | Pokora | 364/210 |
| 4,900,671 | 2/1990 | Pokora | 435/156 |
| 4,939,188 | 7/1990 | Gerber | 523/146 |
| 4,992,372 | 2/1991 | Pokora et al. | 435/192 |
| 5,032,642 | 7/1992 | Lemon | 524/596 |
| 5,110,740 | 5/1992 | Pokora et al. | 435/262 |
| 5,112,752 | 5/1992 | Johnson et al. | 435/192 |
| 5,147,793 | 9/1992 | Johnson et al. | 435/156 |
| 5,151,488 | 9/1992 | Hutchings et al. | 528/179 |
| 5,153,298 | 10/1992 | Pokora | 528/86 |
| 5,178,762 | 1/1993 | Pokora et al. | 210/632 |

*Primary Examiner*—W. Robinson Clark
*Attorney, Agent, or Firm*—David L. Hedden

[57] ABSTRACT

The invention relates to an ester cured no-bake foundry binder system preferably comprising as separate components (a) an aqueous basic solution of a phenolic resole resin; and (b) a hardener comprising (i) a polyphenol resin, and (ii) a liquid ester. Alternatively, the polyphenol resin can be used as a separate component. The foundry binder systems produce foundry shapes with improved tensile strengths when compared to foundry shapes which are prepared from foundry binder systems which do not contain a polyphenol resin.

3 Claims, No Drawings

ESTER CURED NO-BAKE FOUNDRY BINDER SYSTEM

TECHNICAL FIELD

The invention relates to an ester cured no-bake foundry binder system preferably comprising as separate components: (a) an aqueous basic solution of a phenolic resole resin; and (b) a hardener comprising (i) a polyphenol resin, and (ii) a liquid ester.

BACKGROUND OF THE INVENTION

It is known to mix liquid esters and aqueous basic solutions of phenolic resins with sand to make foundry mixes which are made into foundry shapes by the no-bake process. Although these binders have some advantages from an environmental standpoint, the physical properties of the foundry shapes made with these binders are generally inferior to those made from polyurethane-forming binders. In particular, the tensile strengths of foundry shapes made with the liquid esters and aqueous basic solutions of phenolic resole resins are lower. Consequently, there is an interest in finding additives or otherwise modifying the formulations of these binders to improve the tensile strengths of the foundry shapes made with these binders.

SUMMARY OF THE INVENTION

The subject invention relates to an ester cured no-bake foundry binder comprising as separate components:

(a) an aqueous basic solution of a phenolic resole resin;
(b) a hardener comprising
  (i) a polyphenol resin, and
  (ii) a liquid ester.

The subject invention also relates to (a) foundry mixes prepared with the foundry binder system, (b) a process for preparing workable foundry shapes, (c) the shapes prepared with the foundry mixes, (d) a process for preparing metal castings with the workable foundry shapes, and (e) the castings prepared with the workable foundry shapes.

Foundry shapes made with this foundry binder system show improved tensile strengths when compared to foundry shapes made with foundry binders which do not contain an polyphenol resin.

BEST MODE AND OTHER MODES

Definitions

For purposes of this disclosure, a "foundry shape" is a shape used in pouring metal castings and is made by shaping a mixture of a foundry aggregate and a binder. Such shapes include cores, molds, and assemblies of cores and molds.

The "no-bake process" refers to a process for making foundry shapes wherein a foundry mix is formed by mixing an aggregate and a binder which includes a liquid curing agent. The foundry mix is then mechanically forced into a pattern to form a foundry shape. The no-bake process is particularly useful for forming large foundry shapes such as those weighing from about 0.1 to about 1000 kilograms, typically from about 0.5 to about 500 kilograms which require significant worktime and striptime.

Resin Component Of Binder System

The aqueous basic solutions of phenolic resole resins used in the subject binder compositions are prepared by methods well known in the foundry art. The specific method for preparing the aqueous solutions of phenolic resole resins is not believed to be critical to the effective practice of this invention. Those skilled in this art will know what conditions to select depending upon the specific application.

The general procedure involves reacting an excess of an aldehyde with a phenolic compound in the presence of a basic catalyst at temperatures of about 40° C. to about 120° C., typically from about 50° C. to about 90° C., to prepare a phenolic resole resin. Generally the reaction will also be carried out in the presence of water. Preferably, the resulting phenolic resole resin is diluted with a base and/or water so that an aqueous basic solution of the phenolic resole resin results having the following characteristics:

1. a viscosity of less than about 850 centipoise, preferably less than about 450 centipoise at 25° C. as measured with a Brookfield viscometer, spindle number 3 at number 12 setting;
2. a solids content of 35 percent by weight to 75 percent by weight, preferably 50 percent by weight to 60 percent by weight, based upon the total weight of the aqueous basic solution, as measured by a weight loss method by diluting 0.5 gram of aqueous resole solution with one milliliter of methanol and then heating on a hotplate at 150° C. for 15 minutes;
3. an equivalent ratio of base to phenol of from 0.2:1.0 to 1.1:1.0, preferably from 0.3:1.0 to 0.95:1.0; and
4. a pH of preferably about 11 to 13.

It has been found that aqueous basic solutions having viscosities outside the cited range are difficult to use in foundry applications. Aqueous basic solutions with a solids content below the cited range will not sufficiently coat the aggregate while those having a solids content above the cited range will not be sufficiently flowable in the molding equipment. The equivalent ratio specified for the base relates to the need for having solutions which have adequate shelf stability.

Although these ranges have been specified, it should be pointed out that it is not claimed that these aqueous basic solutions are novel products, or that the ranges are critical. The ranges are set forth to provide guidelines for those who want to make and use the invention. Obviously, the invention will usually be practiced more effectively in the preferred ranges specified. With this in mind, more specific procedures will be set forth for preparing phenolic resole resins.

Typical phenolic compounds used to prepare the phenolic resole resins can be represented by the following structural formula:

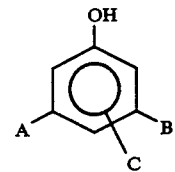

wherein A, B, and C are hydrogen, or hydrocarbon radicals or halogen.

The aldehyde used in preparing the phenolic resole resin may also vary widely. Suitable aldehydes include aldehydes such as formaldehyde, acetaldehyde, propionaldehyde, furfuraldehyde, and benzaldehyde. In general, the aldehydes used have the formula RCHO, where R is a hydrogen or a hydrocarbon radical of 1 to 8 carbon atoms. The most preferred aldehyde is formaldehyde.

The basic catalysts used in preparing the phenolic resole resin include basic catalysts such as alkali or alkaline earth hydroxides, and organic amines. The amount of catalyst used will vary depending upon the specific purposes. Those skilled in the art are familiar with the levels needed.

It is possible to add compounds such as urea when preparing the phenol formaldehyde resole resins as long as the amount is such that it will not detract from achieving the desired properties of the aqueous basic solutions. Urea is added as a scavenger to react with unreacted formaldehyde and decrease the odor caused by it. Although urea may be added for these purposes, it is believed that lower long term tensile strengths may result by the addition of urea. Therefore, if long term tensile strengths are of paramount importance, the urea should be avoided.

The phenolic resole resins used in the practice of this invention are generally made from phenol and formaldehyde at a mole ratio of formaldehyde to phenol in the range of from about 1.1:1.0 to about 3.0:1.0. The most preferred mole ratio of formaldehyde to phenol is a mole ratio in the range of from about 1.4:1.0 to about 2.2:1.0.

As was mentioned previously, the phenolic resole resin is either formed in the aqueous basic solution, or it is diluted with an aqueous basic solution. The base used in the aqueous basic solution is usually a dilute solution of an alkali or alkaline earth metal hydroxide, such as potassium hydroxide, sodium hydroxide, calcium hydroxide, or barium hydroxide, preferably potassium hydroxide or mixtures of sodium hydroxide and potassium hydroxide, in water such that the solution typically contains from about 50 to about 55 percent water by weight.

It should again be mentioned that the aqueous basic solutions described herein are not novel products, nor is their method of preparation. The parameters set forth pertaining to their preparations are merely guidelines for those who want to make the aqueous basic solutions. There may be other effective ways to make them which are not described herein.

Polyphenol resins

The novel aspect of this invention relates to the use of polyphenol resins in these ester cured no-bake alkaline phenolic resole binder systems. The polyphenol resins which are used in this binder system are described as described in U.S. Pat. Nos. 4,900,671, 5,112,752 and 5,153,298 which are hereby incorporated by reference into this disclosure. They include substituted and unsubstituted polyphenol resins. Polyphenol resins are polymers having multiple phenolic rings the majority of which are bonded together by direct linkages rather than methylene, aliphatic ether, or other linkages.

The polyphenol resins are essentially made by reacting a phenol or a substituted phenol with a peroxidase or an oxidase enzyme and peroxide in an organic solvent-containing medium. The phenol or substituted phenol and organic solvent are present at a weight ratio greater than about 0.5:1.0.

Generally, typical phenols used to prepare the polyphenol resins may be represented by the following structural formula:

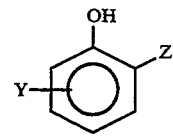

wherein Y and Z are selected from the group consisting of a hydrogen atom; [is present at a position meta or para to the hydroxy group and is selected from the group consisting of] a halogen atom; an alkyl group; an alkoxy group; an aryl group; an allyl group; a —COOR group, where R represents a hydrogen atom, a lower alkyl group, or a phenylalkyl group; a —NR$^1$R$^2$ group where R$^1$ and R$^2$ are the same or different and represent a hydrogen atom, alkyl group, or a phenylalkyl group; or Z in conjunction with the adjacent meta position forms a condensed benzene ring which may be substituted or unsubstituted. Since polymerization proceeds via the ortho or para position, when Y is at the ortho or para position, at least one of Y and Z must be a hydrogen atom.

A single phenol or mixture of phenols may be used to make the polyphenol resins. Multiple ring phenols such as bisphenol A can also be used.

Specific examples of suitable phenols used to prepare the polyphenol resins include phenol, o-cresol, p-cresol, p-t-butylphenol, p-amylphenol, p-octylphenol, and p-nonylphenol.

The polyphenol resins have either of the following structural formulae:

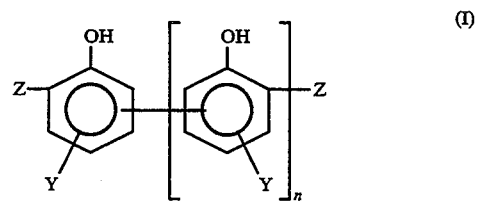

(I)

where (1) n is greater than 0, (2) the phenolic units of the resin are directly bonded to one another through positions ortho or para to the hydroxyl group, and (3) Y is not hydrogen and is present at a position meta or para (preferably para) to the hydroxyl group; or

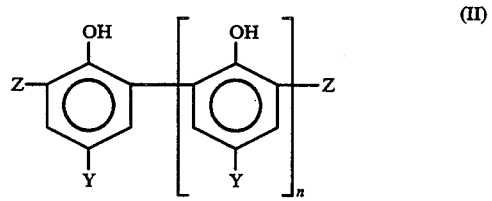

(II)

where n, Y, and Z are defined as in formula (I).

The polyphenol resins can be homopolymers or copolymers, i.e., the individual Y or Z groups may be the same or different and the Y groups may be located at different portions in accordance with formula (I).

Liquid Esters Of Hardener Component

The liquid esters used in the hardener component of the foundry binder system are well known in the art. Those which are preferred include lactones, organic carbonates, carboxylic acid esters, and mixtures thereof.

Generally, low molecular weight lactones are suitable, such as gamma-butyrolactone, valerolactone, caprolactone, beta-propiolactone, beta-butyrolactone, isopentylactone and delta-pentylactone. Carboxylic acid esters which are suitable include those of short and medium chain length, i.e., about $C_1$ to $C_{10}$ carboxylic acids. Specific carboxylic acid esters include, but are not limited to, n-butyl acetate, ethylene glycol diacetate, triacetin (glycerol triacetate), dimethyl succinate, dimethyl glutarate, and dimethyl adipate.

Suitable organic carbonates include propylene carbonate, 1,2-butanediol carbonate, 1,3-butanediol carbonate, 1,2-pentanediol carbonate and 1,3-pentanediol carbonate.

Foundry Aggregate

Any foundry aggregate can be used to prepare the foundry mix. Generally the aggregate will be sand which contains at least 70 percent by weight silica. Other suitable sand includes zircon, olivine, alumina-silicate sand, chromite sand, and the like. Generally, the particle size of the sand is such that at least 80 percent by weight of the sand has an average particle size between 50 and 150 mesh (Tyler Screen Mesh). Mixtures of sand and reclaimed sand can used.

Optional Constituents

Other optional constituents can be used in the binder system. A particularly useful additive to the binder compositions in certain types of sand is a silane such as those having the general formula:

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. Such silanes, when employed in concentrations of 0.1% to 2%, based on the phenolic binder and hardener, improve the humidity resistance of the system.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta(aminoethyl)-gamma-aminopropyltrimethoxy silane); and Union Carbide A-1160 (ureido-silane).

Preparing Foundry Mixes

A foundry mix is typically prepared by mixing the hardener component (b) with the aggregate and then mixing component (a) with the aggregate containing the hardener.

Preparing Foundry Shapes By The No-Bake Process

Preferably, the foundry mix is prepared by first mixing the hardener component (b) with the aggregate before mixing the resin component (a) with aggregate containing the hardener. Foundry shapes are prepared with the foundry mixes by introducing them into a pattern according to techniques well known in the art to form a foundry shape, i.e. core or mold.

The foundry shape is left in the pattern until it is workable. A workable foundry shape is one which can be handled without breaking when it is removed from the pattern. Curing with the liquid ester is carried out according to techniques well known in the art.

Metal castings are produced from the workable foundry shapes in a conventional manner. Essentially, molten metal (ferrous or non-ferrous) is poured into and around the workable foundry shape and allowed to harden. The workable foundry shape is then removed.

Amounts Of Components Used

In making foundry shapes, the aggregate constitutes the major (typically more than 80 percent by weight of the total weight of the foundry shape) constituent and the binder system constitutes a relatively minor amount. The amount of binder system, which includes both components (a) and (b), is generally no greater than about ten percent by weight and frequently within the range of about 0.5 to about 7 percent by weight based upon the weight of the aggregate. Most often, the binder content ranges from 0.6 to about 5.0 percent by weight based upon the weight of the aggregate in most foundry shapes.

In general the weight ratio of component (a) to component (b) of the binder system is from about 100:1 to about 1:1, preferably from about 10:1 to 1:1, most preferably from about 10:1 to about 2:1 weight percent.

The polyphenol resins are used in an amount effective to improve the tensile strengths of the foundry shapes prepared with the foundry binder systems. Generally, the weight ratio of the polyphenol resin to liquid ester in the hardener component is from about 1:10 to about 10:1 based upon the total weight of the hardener, preferably 1:10 to 5:10, and most preferably from about 1:4 to about 1:2 weight percent.

EXAMPLES

Phenolic Resole Resin CR-400

The resin used in Examples 1-2 was an aqueous basic solution of a phenolic resole resin sold under the trademark CHEM-REZ ® 400 binder. It is commercially available from Ashland Chemical, Inc. and will be referred to in the examples as CR-400. It is not believed that the use of this particular resin is critical to the performance of the subject binder systems, and that other commercially available alkaline phenolic resole resins used in no-bake binder systems will work effectively.

CR-400 binder is a urea modified phenol-formaldehyde base catalyzed resole condensate prepared by reacting phenol, paraformaldehyde, and water in the presence of dilute alkali hydroxide bases 45% to 50% in water at elevated temperatures such that the molar ratio of formaldehyde to phenol is about 1.9:1.0, the molar ratio of water to phenol is about 6.77:1.0, the molar ratio of sodium hydroxide to phenol is about 0.07:1.0, the molar ratio of potassium hydroxide to phenol is from about 0.73:1.0, the molar ratio of urea to phenol is about 0.11:1, and the molar ratio of gamma amino propyl triethoxy silane to phenol is about 0.00375:1.0.

The resin component has a solids content of about 53 percent and a Brookfield viscosity of about 115 centipoise at 25° C.

Preparation of Polyphenol Resin (PPR)

In Examples 1–2, the polyphenol resin (PPR) used was a substituted PPR, based on p-t-butylphenol (PTBP). The PPR was prepared according to a procedure similar to example 7 of U.S. Pat. No. 5,112,752.

A five neck reaction flask equipped with temperature controller, addition funnel, stirrer, and condenser was first charged with 76.95 parts of ethanol, 209 parts of PTBP. The mixture was heated to 55° C. Water (153.3 parts) was then added to the reactor and the solution turned into an emulsion. Then, 104 parts of soybean hulls, which were ground and screened through a 30 mesh screen were added to the reactor. To reduce the viscosity of the reactants, an additional 66 parts of ethanol and 132 parts of water were added to the reactor. A 50% solution of hydrogen peroxide (60.75 parts) was slowly added to the reactor with agitation through the addition funnel in one hour. The temperature was kept between 55° C. to 65° C.

At the end of the reaction, agitation was stopped, the reaction mixture was cooled to room temperature, and the finished product settled at the bottom of the reactor. The top layer, which contained water and alcohol, was separated from the bottom layer, which contained the polymer and soybean hulls, by centrifugation. Water (350 parts) was added to the mixture to aid the centrifugation process.

The mixture of polymer and soybean hulls was then air dried on aluminum foil. The solid mixture was then extracted with one liter of ethylacetate to separate the polymer from soybean hulls. The mixture was centrifuged and the supernatant layer was filtered using a GF/F glass fiber filter. The soybean hulls were removed as a solid.

The filtrate was then stripped of ethyl acetate using a rotary evaporator. The polymer was further purified by vacuum stripping with a vacuum pump at 96° C. at 0.3 mm Hg pressure for 2 hours. A total of 140 parts of PPR was obtained.

The PPR was then formulated with a liquid ester, glyceryl triacetate (triacetin) or butyrolactone, to form a foundry binder hardener as described in Examples 1–2. The weight ratio of PPR to liquid ester was about 1:4.

The examples which follow will illustrate specific embodiments of the invention. They are not intended to imply that the invention is limited to these embodiments.

EXAMPLES 1–2

Foundry mixes were prepared with two component binder system by mixing 2.0 weight percent, based upon the weight of sand, of the binder system with Wedron 540 sand. The weight ratio of aqueous alkaline phenolic resole resin (CR-400) to hardener component was 4:1. The weight ratio of polyphenol resin to triacetin in the hardener was 1:4.

The tensile strengths of foundry shapes made with the binder system were measured according to AFS standard testing procedures used for no-bake foundry binders. The hardener was first mixed with the sand and then the aqueous basic solution of phenolic resole resin was mixed with the sand containing the hardener component to form the foundry mix. The foundry mix was then forced into a standard core box (dog bone shape) and allowed to cure. Tensile strengths (in psi) of the cured samples were then measured by conventional methods.

In both examples, the same components and amounts (described previously) were used unless otherwise specified. CONTROL A uses triacetin without any polyphenol resin (PPR) at the same 25% level based on the weight of the alkaline phenolic resin. After removing (stripping) the cured samples from the core box, the tensile measurements were made at one hour, three hours, 24 hours, and 24 hours+1 hour at 100% R.H. at 25° C. Table I show the results.

TABLE I (CR-400 cured with an 80/20 blend of triacetin and PPR)
Sand: 3000 g Wedron 540
Binder Level: 2% B.O.S.[1] CR-400
Coreactant: 80/20 blend of triacetin and PPR B.O.I.[2]

| EXAMPLE | Time (Min). at Mold Hardness of 60/90 | Tensile(psi)/Scratch Hardness | | | |
|---|---|---|---|---|---|
| | | 1 HR. | 3 HR. | 24 HR. | 24 HR. + 1 HR. 100% RH |
| CONTROL A | 12/16 | 102/76 | 170/85 | 209/86 | 178/85 |
| 1 | 13/18 | 122/97 | 180/83 | 226/86 | 201/85 |

[1]B.O.S. = based on weight of sand
[2]B.O.I. = based on the weight of alkaline phenolic resole resin.

[1]B.O.S.=based on weight of sand
[2]B.O.I.=based on the weight of alkaline phenolic resole resin.

Table I indicates that foundry shapes from the sand mix containing the PPR gave consistently higher tensile strengths than the CONTROL which did not contain PPR.

EXAMPLE 2

The procedure of Example 1 was followed except butyrolactone was used as the ester hardener instead of triacetin and the time for mixing the binder and sand was one minute. CONTROL B did not contain any PPR.

TABLE II (CR-400 cured with an 80/20 blend of butyrolactone and PPR)
Sand: 3000 g Wedron 540
Binder level: 2% B.O.S. CR-400
Coreactant: 80/20 blend of butyrolactone and PPR, 25% B.O.I.

| EXAMPLE | Time (Min.) @ Mold Hardness 60/90 | Tensile (psi)/ Scratch Hardness | | | |
|---|---|---|---|---|---|
| | | 1 HR. | 3 HR. | 24 HR. | 24 HR. + 1 HR. 100% RH |
| CONTROL B[3] | 2/4 | 92/61 | 105/63 | 148/65 | 89/62 |
| 2 | 2/3 | 90/59 | 102/62 | 166/73 | 112/65 |

[3]These results were an average of two test runs.

[3]These results were an average of two test runs.

Table II shows that an increase in tensile strengths, especially in the 24 hours+1 hour at 100% R.H., occurs by incorporation of PPR.

We claim:

1. A foundry mix for preparing foundry shapes by a no-bake process which comprises in admixture:
   (a) a foundry aggregate,
   b) an aqueous basic solution of a phenolic resole resin; and
   (c) a hardener comprising:

(i) an polyphenol resin; and
(ii) a liquid ester co-reactant such that the amount of aggregate is at least 80 weight percent of the foundry mix, the weight ratio of (b) to (c) is from 10:1 to 1:1 and the weight ratio of (i) to (ii) is from 1:10 to 1:1.

2. The foundry mix of claim 1 wherein the polyphenol resin used in the hardener is prepared with p-t-butyl phenol.

3. The foundry mix system of claim 2 wherein the weight ratio of component (b) to component (c) in the system is from 10:1 to 2:1.

* * * * *